United States Patent Office 3,249,398
Patented May 3, 1966

3,249,398
INORGANIC METAL OXIDES CONTAINING COBALT, ANTIMONY AND TANTALUM AND METHOD OF PREPARING SAME
Gerhard Bayer, Hinteregg-Zurich, Switzerland, assignor to Owens-Illinois, Inc., a corporation of Ohio
No Drawing. Filed July 5, 1962, Ser. No. 207,784
3 Claims. (Cl. 23—14)

This application is a continuation-in-part of Serial No. 54,602, filed September 8, 1960, now U.S. Patent 3,053,684 issued September 11, 1962.

This invention relates to certain inorganic metal oxide compounds. In a more specific aspect, the invention relates to new inorganic metal oxide compounds which can be prepared in spinel type crystalline form, and to methods for the preparation of such compounds.

It is an object of this invention to provide new inorganic metal oxide compounds of antimony, cobalt, and tantalum.

It is a further object of this invention to provide methods for the preparation of such compounds.

A more specific object of this invention is to provide new spinel type inorganic metal oxide crystalline compounds, and to provide methods for their preparation.

According to the present invention, I have discovered new compounds of the formula $$Co_{2.33}Sb_{(0.67-x)}Ta_xO_4$$

where $x$ is ½ of 0.67 or less.

In the formula above, tantalum is usually present in the compound in such amounts that $x$ is at least 0.05, more often at least 0.2. In any case, $x$ is always a positive finite number and never equals 0.

In my parent application, the compound $Co_{2.33}Sb_{0.67}O_4$ is described and claimed. The present series of compounds results from the substitution of part of the antimony by tantalum. Very surprisingly, the X-ray pattern and the lattice constants of the present compounds are identical with those of the corresponding spinel containing only cobalt and antimony.

In general, the compounds of the present invention are prepared by solid state reactions by a method which comprises mixing powders of the corresponding oxides, pressing them into cohesive shapes, and firing the intimately admixed components for a period of time at an elevated temperature. For instance, ten hours at 1260° C. is satisfactory. However, longer or shorter times can be employed, say, from six to fifteen hours at temperatures from 1100 to 1350° C., although times and temperatures outside these ranges can be employed. Generally, the longer times are employed at the lower temperatures and vice versa. Usually, the temperature employed is from 1200 to 1350° C. Generally this heating step at such elevated temperatures should be preceded by a preheating step at a lower temperature to avoid volatilizing the antimony oxide. Generally, preheating at 650 to 800° C. for from 15 to 25 hours is satisfactory, followed by slowly raising the temperature over a period of several hours to the final value in the range from about 1100 to 1350° C. This procedure not only avoids volatilization but allows oxidation of the antimony compound to the pentavalent state. Obviously the limits of the time and temperature ranges which can be employed to prepare a compound containing a component in given ratios can be easily determined, if desired, by routine tests.

Generally, the simple oxides of the individual metals are mixed in proportions to prepare the desired compound, as called for by the formula of the particular compound desired.

As the starting material antimony oxide, $Sb_2O_3$, $Sb_2O_4$ or $Sb_2O_5$, can be used, although $Sb_2O_3$ is usually employed because of its ready availability. The firing step is conducted in an oxidizing atmosphere, such as air or oxygen or other atmosphere containing elemental oxygen in order to obtain and maintain the antimony in the five-valent state.

Since the amount of tantalum present in the instant crystalline compounds of the invention is continuously variable, some authorities would not, strictly speaking, call these products "compounds." Thus, the new products of the invention can also be termed compositions in the form of crystals having the formula $$Co_{2.33}Sb_{(0.67-x)}Ta_xO_4$$

where $x$ is a finite positive number and has a value of up to ½ of 0.67.

In a specific example of the methods and products of the invention, the compound $Co_7SbTaO_{12}$ was prepared by mixing finely powdered cobaltous oxide, finely powdered antimony trioxide and finely powdered tantalum pentoxide in the ratio of 14 moles of cobaltous oxide to 1 mole of antimony trioxide and one mole of tantalum pentoxide. The powdered mixture was pressed into cohesive disc shape and the disc was fired in the presence of air slowly up to 800° C. (during twenty hours) in order to oxidize the $Sb_2O_3$ to $Sb_2O_5$, and thereafter was heated slowly to 1000° C., held there for twenty hours and then slowly heated to 1250° C. and held at that temperature for twenty hours. After cooling to room temperature the sample was analyzed by the X-ray powder diffraction techniques. The analysis showed the pattern identical with that of pure $$Cd_{2.33}Sb_{0.67}O_4$$

No other X-ray pattern was present. No X-ray pattern of any of the starting materials was present. Therefore, the X-ray pattern of the new compound is exactly (within limits of error of the technique) the same as of the corresponding compound having no tantalum present. The X-ray pattern showed that the new compound was of a spinel type crystalline form with a lattice constant $a_0 = 8.585 \pm 0.005$ Angstrom units. This is in complete agreement with the theoretical lattice spacing.

The new compounds of the invention have varied uses. For instance, they can be used for coloring glass. For example, the compounds can be added to a glass batch as a ready source of cobalt oxide colorant. The cobalt compound can be added in powder form in the forehearth of a glass furnace when making a soda-lime-flint glass, for instance, to obtain a blue color, using 0.05 to 0.2 weight percent of the cobalt compound of the invention.

The new compounds of the invention are also useful as pigments and fillers for paints in normal paint-making processes. For instance, the following paint formula can be used:

| Ingredient | Lbs. |
|---|---|
| Compound of invention | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

In addition to the foregoing practical uses, the new compounds of the invention are useful in expanding the fund of knowledge in this field. Also, study of these compounds will be helpful to other scientific workers in this field in suggesting avenues of approach to prepare similar new compounds of a spinel crystalline structure.

As will be evident to those skilled in the art, various modifications of the invention can be made or followed in the light of the foregoing disclosure and discussion without departing from the spirit and scope of the disclosure or from the scope of the claims.

I claim:

1. A new composition in the form of spinel-type crystals having the formula $$Co_{2.33}Sb_{(0.67-x)}Ta_xO_4$$

where $x$ is a finite positive number and has a value of up to ½ of 0.67.

2. A method of preparing a new composition in the form of spinel-type crystals having the formula $$Co_{2.33}Sb_{(0.67-x)}Ta_xO_4$$

where $x$ is a finite positive number and has a value of up to ½ of 0.67 which comprises intimately admixing powders of the oxides of the metals in the said formula in proportions called for by said formula, pressing said powders into a cohesive shape, and firing said shape in an oxidizing atmosphere at an elevated temperature to effect a solid-state reaction, and thereby forming said crystalline compound.

3. A new composition in the form of spinel-type crystals having the formula $$Co_{2.33}Sb_{0.67/2}Ta_{0.67/2}O_4$$

References Cited by the Examiner

UNITED STATES PATENTS 3,053,684   9/1962   Bayer _____ 106—292

OTHER REFERENCES

Azaroff et al., The Powder Method in X-ray Crystallography, McGraw-Hill and Co., Inc., New York, 1958, page 181 of particular interest.

Bunn, Chemical Crystallography, 2d Ed., The Clarendon Press, Oxford, 1961, pages 8, 9 and 131.

Dulac et al.: "Comptes Rendus," Tome 251, August 1, 1960, pages 747 to 749.

OSCAR R. VERTIZ, *Primary Examiner.*

MAURICE A. BRINDISI, BENJAMIN HENKIN,
*Examiners.*

E. STERN, H. T. CARTER, *Assistant Examiners.*